United States Patent [19]

Matteini et al.

[11] Patent Number: 5,266,351
[45] Date of Patent: Nov. 30, 1993

[54] PROCESS FOR THE PROTECTION AND AGGREGATION OF METAL MATERIALS OF ARTISTIC INTEREST

[75] Inventors: Mauro Matteini, Firenze; Vincenzo Massa, Varese; Giovanni Moggi; Adolfo Pasetti, both of Milan, all of Italy

[73] Assignee: Syremont S.p.A., Milan, Italy

[21] Appl. No.: 851,086

[22] Filed: Mar. 13, 1992

[30] Foreign Application Priority Data

Mar. 15, 1991 [IT] Italy .......................... MI91 A 000703

[51] Int. Cl.$^5$ .......................... B05C 13/00; B32B 27/00
[52] U.S. Cl. .................................... 427/142; 428/421; 428/463; 428/341
[58] Field of Search ................ 427/142; 428/421, 463, 428/341

[56] References Cited

U.S. PATENT DOCUMENTS 4,487,878 12/1984 Vasta .................................... 524/413

FOREIGN PATENT DOCUMENTS

0435330A1 12/1990 European Pat. Off. .

OTHER PUBLICATIONS

World Patents Index Abstract No. AN85-126964 entitled "Restoration of Old Archeological and Museum Facrics Involves Using Copolymer of Vinylidenefluoride and Hexafluropropylene as reinforcing Polymer" dated & page unavailable.
"Bononiachem 88", XVI Congresso Nazionale de Chimica, Bologna, Italy, Oct. 9–14, 1988, p. 272.
Scienza c Beni Culturali, Bressanone, Jun. 24–27, 1986, pp. 597–611.

*Primary Examiner*—Anthony McFarlane
*Assistant Examiner*—Nhat D. Phan
*Attorney, Agent, or Firm*—Bryan Cave

[57] ABSTRACT

Surface portions of metal materials, in particular artifacts which are of interest from historical, artistic or archeological perspectives, are protected from atmospheric agents and pollutants, and are re-aggregated, by reversibly applying a protecting and aggregating material comprising a copolymer of vinylidene fluoride having 55–85 mol % of vinylidene fluoride, 10–45 mol % of hexafluoropropene and 0–30 mol % of tetrafluoroethylene. Such polymers are applied onto the surface to be protected as solutions in volatile solvents.

13 Claims, No Drawings

PROCESS FOR THE PROTECTION AND AGGREGATION OF METAL MATERIALS OF ARTISTIC INTEREST

BACKGROUND OF THE INVENTION

It is well-known that the metals or alloys commonly used in technological applications, both the types used in ancient times, and those used nowadays, undergo, over time, structural modifications and/or more or less deep and radical chemical or mineralogical transformation processes and corrosion processes. The alterations and transformations of metal artefacts may vary from modifications concerning the superficial layers, and internal microstructural modifications which concern the granulometry of the microcrystals which constitute metals and alloys, up to the most serious decay, so extended as to render unrecognizable the original metal or alloy.

For example, copper and its alloys, when exposed to air rich in moisture and carbon dioxide, sulfur dioxide and hydrogen sulfide, are coated by thin layers of oxides, salts and basic salt hydrates, whilst iron artefacts, in particular if recovered by excavations, undergo nearly always extremely extended and devastating alterating processes based on corrosion.

In general, the restoration of metal materials, in particular those of archeological and historical-artistical interesting, involves the following operations:

1) Cleaning and possible removal of surface corrosion products;
2) Reassembly;
3) Integration;
4) Aggregation;
5) Protection.

Obviously, all, or some, of the above operations from (2) to (4) can be avoided if the artefact is in such conditions as to only require the protection operation.

As regards the two last operations, which are the subject-matter of the present invention, and can be accomplished in one single step, a plurality of essential characteristics are required.

In order to be able to perform the desired action, without simultaneously inducing side decay phenomena and, anyway, undesired side effects, the aggregating-protecting agent should display the following characteristics:

Adhesiveness:
Need for a good adhesion to the underlying substrate, with the guarantee that no peeling or delamination possibilities exist;

Reversibility:
Possibility of removal of the surface film with solvents which do not have an influence on the artefact, or on the material used for bonding or reintegrating the material;

Elasticity:
Also in case of dimensional changes of metal support, owing to temperature changes, the aggregating-protecting agent should retain its continuity, and consequently also its functionality;

Unalterability and stability:
Absence of changes in colour and chemical and physical characteristics over time, also in a polluted atmosphere; absence of chemical interaction between the aggregating-protecting agent and the substrate;

Inertness towards moisture:
The product should not absorb water and anyway should prevent the substrate from coming into contact with water; it should be neither degraded, nor cross-linked;

Insensibility to U.V. light:
Exposure to light, in particular to sun light, should not cause phenomena of degradation of the protectant;

Transparence:
The protectant should not alter the original appearance of the underlying material, and allow a perfect view of the artefact;

Insensibility to heat and temperature excursions:
Possible exposure to heat sources should not alter the functionality of the aggregating-protecting agent, nor phenomena of low-temperature embrittlement should occur; for indicative purposes, the product should retain its functionality at least within the temperature range of from $-25°$ C. up to $+100°$ C.;

Easiness of application:
Above all for delicate pieces, which should not be submitted to treatments which may be dangerous for their integrity.

It is well-known that in order to protect and reaggregate artefacts constituted by metals or metal alloys, organic substances are frequently used, such as waxes, of the type of beeswax, which contain functional groups of ester, carboxy, alcohol types.

Microcrystalline waxes based on saturated hydrocarbons, acrylic resins and silicone resins are used as well; the three last classes of compounds are those which are presently most widely used in the concerned sector.

As a matter of fact, inasmuch as they contain functional groups of carbonylic type, waxes, such as beeswax, show poor stability to U.V. light, show a tendency to discolour with time (i.e., to turn into yellow), and their use on artefacts exposed to atmospheric agents requires frequent maintenance operations in order to obviate their insufficient stability.

Although they are more stable to the action of U.V. light, microcrystalline waxes, owing to the presence in their molecule of tertiary hydrogen atoms (C—H) undergo the photo-oxidative attach leading, as in the above case, to the formation of acidic products, or to products anyway harmful to the substrate.

Furthermore, the low melting or softening point, close to 63° C. for beeswax and 70° C. for microcrystalline waxes, may lead to these protectants leaving the substrate by flow.

As regards acrylic resins, their tendency to undergo chemical alterations due to natural long-term ageing was already demonstrated (Proceedings of Meeting <<Bononiachem 88>>-National Meeting of Italian Chemical Society, Bologna, 1988, page 272). Also silicone resins show phenomena of instability upon natural ageing, and upon accelerated ageing when submitted to U.V. light (Proceedings of Meeting <<Science e Beni Culturali [Sciences and Cultural Patrimonyl>>, Bressanone, 1986, pages 597-611); in both cases, FT-IR analysis demonstrated, after ageing, the presence of bands which might be correlated with the formation of acidic moieties.

Because—as illustrated hereinabove—the presently used product to not display all the characteristics required from an aggregating-protecting agent for metal surfaces, the need emerged for developing suitable compounds endowed with higher chemical stability.

SUMMARY OF THE INVENTION

The present Applicant found now a method for protecting and aggregating surfaces of metal materials and their alloys, and of artefacts of such materials, against the degrading action by atmospheric and polluting agents, which method does not show the drawbacks deriving from the use of the above mentioned materials.

The method consists in applying onto the surface of metals and their alloys, and on metal artefacts, a protectant comprising a copolymer of vinylidene fluoride containing from 55 to 85 mol % of vinylidene fluoride, from 0 to 30 mol % of tetrafluoroethylene and from 10 to 45 mol % of hexafluoropropene, and preferably from 60 to 80 mol % of vinylidene fluoride, from 0 to 20 mol % of tetrafluoroethylene and from 16 to 25 mol % of hexafluoropropene.

The latter compositions supply the copolymer with a stronger elastomeric character and an easier solubility in such solvents as acetone, methyl-tert.-butyl-ether, Delifrene AC (an azeotropic mixture consisting, by weight, of 12.5% acetone, and 87.5% 1.1.2-trichlorotrifluoroethane).

The copolymers of vinylidene fluoride with the above said monomers are widely known in the art. They are described, among others, in Kirk-Othmer <<Encyclopedia of Chemical Technology>>, Vol. 11, page 64, 1980 and in <<Polymer>>, Vol. 27, page 906, 1986).

The use of such polymers can be carried out by coating, by means of any u usual technique, e.g., by brush, compressed-air gun, spray or dipping, a solution of said copolymers in an organic solvent onto the surface of the material which constitutes the artefact to be protected.

The solution of fluoropolymer can be prepared, e.g., in a suitable ketonic, ester or ethereal solvent having a low enough boiling point to rapidly evaporate after the application, when a fast removal of solvent is required.

Esters such as methyl or ethyl acetate, ketones such as methyl-ethyl-ketone or ethers such as tetrahydrofuran or methyl-tert.-butylether, are particularly suitable for the intended purpose.

When, on the contrary, a slower removal of solvent is required, higher-boiling point solvents can be used, such as, e.g., methyl-isobutyl-ketone, butyl or amyl acetate, or other products having a similar structure.

With suitable mixtures of solvents with different volatility characteristics, the evaporation kinetics of the solution can be changed and tailored to different application requirements.

The concentrations of fluoropolymer solutions to be used for that purpose are generally comprised within the range of from 1% to 10%, preferably of from 1.5% to 5% by weight, with the solvent being selected from among those indicated hereinabove, or among others having volatilities of the same order of magnitude.

The amount of protectant to be applied per unit surface-area of the material to be reaggregated/protected is a function of the physical characteristics of the surface, such as, e.g., the state of de-aggregation of the same material. Said amount is generally comprised within the range of from 10 to 100 $g/m^2$ of surface-area.

EXAMPLE 1

Used products

P1 Elastomeric copolymer of vinylidene fluoride; trade name: Tecnoflon NH (produced by Montefluos S.p.A., Milan); composition, by mol: 79% vinylidene fluoride; 21% hexafluoropropene;

P2 Ethyl-methacrylate/methyl acrylate copolymer (ratio 2:1 by mol);

P3 Polymethylphenylsiloxane.

The waxes were not taken into consideration, owing to their low softening or melting points, which, as a consequence thereof, preclude the application for outdoor exposed artefacts.

Three bronze specimens (A, B, C) having dimensions of 5×5×0.5 cm prepared by cutting a bronze plate exposed for some ten-year periods to atmosphere, were used. The specimens were prepared in such a way, as to only operate on those surfaces which had undergone natural aging, and which were washed with atomized water before being submitted to the treatments.

Onto the upper face of specimen "A", 50 $g/m^2$ of fluoroelastomer Tecnoflon NH was coated by brush from a solution at 3% by weight in Delifrene AC.

Onto the upper face of specimen "B", 50 $g/m^2$ of PZ was coated by brush from a solution at 5% by weight in methylene chloride.

Onto the upper face of specimen "C", a solution of P3 at 3% by weight in toluene was coated, in such a way as to leave on metal surface 50 $g/m^2$ of polymer, after the evaporation of the solvent.

The specimens were submitted to the action of 300-W Osram U.V. lamps of solar MLU type placed at a distance of 17 cm, for 15 days, and then were submitted to the following observations. "A" specimen did not show any colour changes.

The protectant was quantitatively recovered from it, by extraction with acetone, and was submitted to structure analysis. The FT-IR spectrum thereof did not show any changes relatively to the same spectrum as obtained from the product before the application. The metal surface was examined by optical microscopy and FT-IR spectrophotometry, and did not show any changes relatively to its characteristics as observed before the treatment.

"B" specimen showed discoloration. By treatment with methylene chloride, approximately 70 mg of polymer were recovered, which, at FT-IR analysis, showed changes as compared to the spectrum of the product before the application. In particular, the presence was observed of bands connected with the formation of acidic products. The examination of the plate under optical microscopy and by FT-IR spectrophotometry evidenced changes relatively to the initial situation, with organic residues being present, which could not be extracted by solvent. Therefore, the system is not suitable, because the protecting product undergoes alterations, and is not reversible after ageing.

A similar situation was observed in the case of "C" specimen.

The extraction with toluene allowed only 30 mg to be obtained of a product showing changed in its FT-IR spectrum, which evidenced that the product is not stable; in particular, new bands were found.

As regards the examination of the metal plate, the situation is similar to as observed for "B" specimen.

EXAMPLE 2

Evaluation of optical alterations after ageing by exposure to U.V. light.

| Product | g/m² | 200-hrs. exposure | | g/m² | 1000-hrs. exposure | |
|---|---|---|---|---|---|---|
| P1 | 20 | A | − | 50 | A | − |
|    |    | B | − |    | B | − |
| P2 | 20 | A | + | 50 | A | ++ |
|    |    | B | − |    | B | −+ |
| P3 | 20 | A | − | 50 | A | −+ |
|    |    | B | −+ |    | B | + |

A = colour change;
B = increase in reflectance;
− = none;
+ = small;
++ = large;

The products were applied as disclosed in Example 1, and underwent the same type of ageing caused by exposure to U.V. light.

We claim:

1. A process for protecting and aggregating the surface of metal materials to prevent degradation by atmospheric and polluting agents, said process comprising applying a reversible protecting and aggregating material onto the surface of said materials, said reversible protecting and aggregating material comprising a copolymer of vinylidene fluoride containing from 55 to 85 mol % of vinylidene fluoride, from 10 to 45 mol % of hexafluoropropene and from 0 to 30 mol % of tetrafluoroethylene.

2. Process according to claim 1, in which the copolymer of vinylidene fluoride contains from 60 to 80 mol % of vinylidene fluoride, from 16 to 25 mol % of hexafluoropropene and from 0 to 20 mol % of tetrafluoroethylene.

3. Process according to claim 1, wherein the reversible protecting and aggregating material is applied to copper and copper alloys.

4. Process according to claim 1, in which the copolymer is applied from a solution in an organic solvent, in an amount of from 10 to 100 g/m² of surface-area of material.

5. Process according to claim 1, wherein the metal materials are artifacts made of metal or metal alloys.

6. Metal materials coated on their surface with a reversible layer of protecting and aggregating material, comprising a copolymer of vinylidene fluoride containing from 55 to 85 mol % of vinylidene fluoride, from 10 to 45 mol % of hexafluoropropene and from 0 to 30 mol % of tetrafluoroethylene.

7. Process according to claim 1, wherein the metal materials are metal alloys.

8. Process according to claim 5, wherein the reversible protecting and aggregating material is applied for the restoration and the protection of artifacts of historical-artistic interest.

9. Process according to claim 7, in which the copolymer of vinylidene fluoride contains from 60 to 80 mol % of vinylidene fluoride, from 16 to 25 mol % of hexafluoropropene and from 0 to 20 mol % of tetrafluoroethylene.

10. Process according to claim 7, in which the copolymer is applied from a solution in an organic solvent, in an amount of from 10 to 100 g/m² of surface-area of metal alloy.

11. Process according to claim 5, in which the copolymer of vinylidene fluoride contains from 60 to 80 mol % of vinylidene fluoride, from 16 to 25 mol % of hexafluoropropene and from 0 to 20 mol % of tetrafluoroethylene.

12. Process according to claim 5, in which the copolymer is applied from a solution in an organic solvent, in an amount of from 10 to 100 g/m² of surface-area of artifact.

13. Metal materials according to claim 6, wherein the metal materials are artifacts.

* * * * *